United States Patent [19]
Bandat

[11] Patent Number: 6,085,036
[45] Date of Patent: Jul. 4, 2000

[54] DATA BASE STRUCTURE AND MANAGEMENT

[75] Inventor: Kurt Bandat, Vienna, Austria

[73] Assignee: International Business Machines Corporation, Armonk, N.Y.

[21] Appl. No.: 07/991,046

[22] Filed: Dec. 15, 1992

[30] Foreign Application Priority Data

Dec. 23, 1991 [EP] European Pat. Off. .............. 91122147

[51] Int. Cl.⁷ ...................................................... G06F 9/40
[52] U.S. Cl. ............................................................ 395/712
[58] Field of Search ..................................... 395/700, 712

[56] References Cited

U.S. PATENT DOCUMENTS

| | | | |
|---|---|---|---|
| 4,558,413 | 12/1985 | Schmidt et al. | 707/203 |
| 4,809,170 | 2/1989 | Leblang et al. | 395/703 |

OTHER PUBLICATIONS

Katz; "Toward a Unifed Framework for Version Modeling in Engineering Databases"; ACM Computing Surveys, v22, n4; 1990.

Feiler; "Configuration Management Models In Commercial Environments"; CMU; Mar. 1991.

Proc. Compsac 85, The Ninth Int. Computer Software & Applications Conf., Oct. 9, 1985, Chicago, IL; pp. 472–479; C.V. Ramamoorthy et al.; "An Integrated Environment for Supporting Development & Evolution of Software".

Proc. Compsac 89, The Thirteenth Annual Int. Computer Software & Application Conf.; Sep. 20, 1989, Orlando, FL, pp. 404–411; J. Estublier et al.; "Structuring Large Versioned Software Products".

Proc. Conference on Software Maintenance, 1988; Oct. 24, 1988; Phoenix, AZ, pp 222–228; H.S. Render et al.; "Clemma: The Design of a Practical Configuration Librarian".

Proc. Conference on Software Maintenance 1988; Oct. 24, 1988; Phoenix, AZ; pp 172–177; K. Venkatramani et al.; "Using Configured Directories to Solve Software Maintenance Problems".

IBM Technical Disclosure Bulletin; vol. 32, No. 3B; Aug. 1989, New York pp 280–287; "Logically Deleted Parts".

Primary Examiner—Alvin E. Oberley
Assistant Examiner—St. John Courtenay, III
Attorney, Agent, or Firm—Arthur J. Samodovitz

[57] ABSTRACT

A computer system structures and manages programs and data as components of objects. Different versions of each object may exist. An object table, version table and component table are provided into which particular time data and address references are entered. By means of these tables, a component is copied only in response to an actual change. Unchanged components are associated with the different object versions by means of tables.

17 Claims, 5 Drawing Sheets

FIG. 1

| COMPONENT TABLE (ADDR. 02) | | | | | |
|---|---|---|---|---|---|
| COM-PONENT NAME | COM-PONENT TYPE | COM-PONENT CHARACTER-ISTIC | CREATION DATE | DELETION DATE | ADDRESS |
| SAL–DOC | PANEL | ENGL | 27 16 23 02 91 | % | ADDR.A |
| SAL–DOC | PANEL | GERM | 41 09 27 03 91 | 07 13 28 03 91 | ADDR.B |
| SAL–DOC | CODE | % | 19 17 05 01 91 | % | ADDR.C |
| ⋮ | ⋮ | ⋮ | ⋮ | ⋮ | ⋮ |
| 40 | 41 | 42 | 43 | 44 | 45 |

FIG. 4

OBJECT TABLE (10)

| OBJECT NAME | OBJECT TYPE | FIRST REFERENCE | SECOND REFERENCE |
|---|---|---|---|
| SALARY | DOCUMENT | ADDR.01 | ADDR.02 |
| SALARY | PROGRAM | ADDR.11 | ADDR.12 |
| PENSION | PROGRAM | ADDR.21 | ADDR.22 |
| ⋮ | ⋮ | ⋮ | ⋮ |

VERSION TABLE (ADDR.01) (11)

| VERSION NAME | VERSION STATUS | VALIDITY DATE | COMPLETION DATE |
|---|---|---|---|
| 1990 | BLOCKED | 00 00 01 01 90 | 10 18 05 11 90 |
| 1991 | OPEN | 00 00 01 01 91 | 06 16 11 09 91 |
| 1992 | BEING PROCESSED | 00 00 01 01 92 | |
| ⋮ | ⋮ | ⋮ | ⋮ |

DATA BASE STRUCTURE AND MANAGEMENT

BACKGROUND OF THE INVENTION

The invention concerns structure and management of a computer data base comprising programs and data stored in the form of objects, wherein there are different object versions and the objects are made up of several components.

In software development for computer systems a long-standing requirement has been to subdivide larger software objects, i.e. programs and data, belonging to the same package into smaller components to render the entire object more readily manageable. For changing the object, if required, only the component concerned has to be copied and changed, while the other components remain unchanged. Any such unchanged components then constitute an old version of the object, whereas the copied and changed component along with the unchanged components form a new version. Despite the fact that such change is limited to a single component, many computer systems also copy the components that remain unchanged, storing them as a new version along with the changed component. As a result, a plurality of components exist several times over so that storage space in the storage means of the computer system is wasted.

It is the object of the invention to provide a method of managing programs and data of the previously described kind which permits optimum use of the storage means.

SUMMARY OF THE INVENTION

According to the invention, this object is accomplished by a method of the previously described kind in that an object table is stored in the storage means, which contains for each object an object name and a reference to a version table and a component table. The version table is stored in the storage means at the first referenced position storing for each version a completion date up to which the version was processed. The component table is stored in the storage means at the second referenced position containing for each component a component name and a creation date indicating the date on which the component was created, as well as a reference to an address at which the component is stored in the storage means.

The object table, the version tables and the component tables avoid the same components being repeatedly stored in the storage means. With the aid of the information contained in these tables, the various components of a particular object version are read from the storage means. It is also possible to read predetermined components of a particular version from the storage means. A component is copied only if it is to be changed and has not been previously generated in another version. With regard to unchanged components, these are not multiplied for but associated with the different versions by means of the aforementioned tables. By providing the completion and creation dates not only in the form of a date but as a point in time by specifying the respective day and hour, the individual components, versions and objects can be accurately associated with each other.

According to a preferred embodiment of the invention, for processing one of the objects on the basis of the object name, the associated references to the version table and the component table are read from the object table to allow reading from the component table all those references to addresses which were the first to be associated with a creation date older than the completion date specified for the desired version in the version table. This completion date marks the time up to which the desired version was processed. Each creation date older than the completion date thus denotes a component that was created before completion of the desired version. A creation date of a component equalling the completion date of a version associates this component with the subsequent version. Picked as the relevant component and associated with the desired version is the first of these components which in retrospect was created before completion of processing of the desired version. This procedure is repeated for all components listed in the table, which in their totality make up the composite object of the desired version.

According to another preferred embodiment of the invention, for processing one of the components of an object by means of the component name, the component table associated with the object is read for the reference to the address that was the first to be associated with a creation date older than the completion date specified for the desired version of the object in the version table. As previously mentioned, the completion date marks the time at which the processing of the desired version was completed. Thus, the selected component is that one which based on this time data was the first to be created in retrospect or the last to be created when the desired version was processed.

If the component stored under the reference read from the component table is to be changed, it is copied and then entered into the component table with a creation date corresponding to the completion date as well as with a reference to an address at which the copied component is stored in the storage means. In this way the component to be changed is available unchanged for subsequent versions, i.e. the change of the component is not propagated in subsequent versions but becomes effective only in the version in which it was made.

A computer system for implementing the method comprises storage means in which programs and data are stored in the form of objects, wherein there are different object versions and the objects are made up of several components. Such a computer system is characterized in that an object table, a version table and a component table are stored in the storage means, that the object table contains for each object an object name and a reference to the version table and the component table, that the version table stores a completion date for each version up to which the version was processed, and that the component table contains for each component a component name and a creation date marking the date on which the component was created, as well as a reference to an address at which the component is stored in the storage means.

One way of carrying out the invention is described in detail below with reference to drawings which illustrate only one of several favorable embodiments of the invention, in which:

DETAILED DESCRIPTION OF THE PREFERRED EMBODIMENTS

Figure 1:
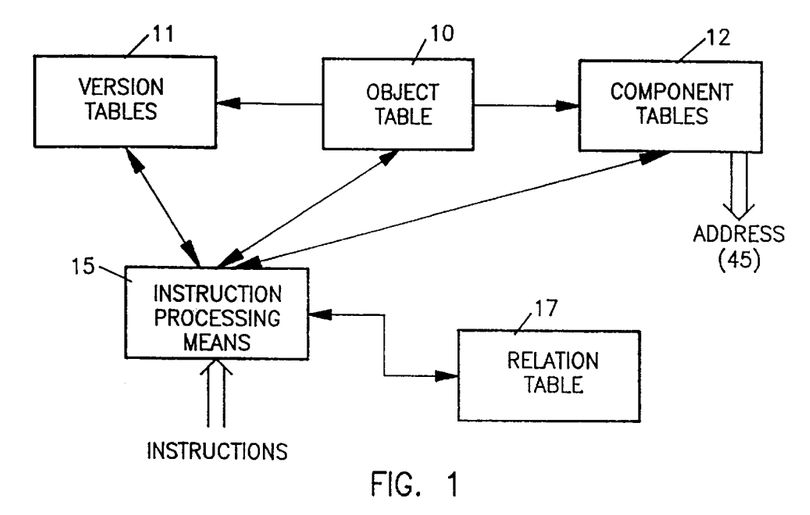
FIG. 1 is a block diagram of a preferred embodiment of the invention.

The schematic block diagram of FIG. 1 shows a section of a computer system which comprises at least one processor 9 and RAM storage means 16. The storage means stores data items hereinafter referred to as components. These components make up objects existing in different versions.

The storage means also stores an object table 10, version tables 11 and component tables 12.

Figure 2:
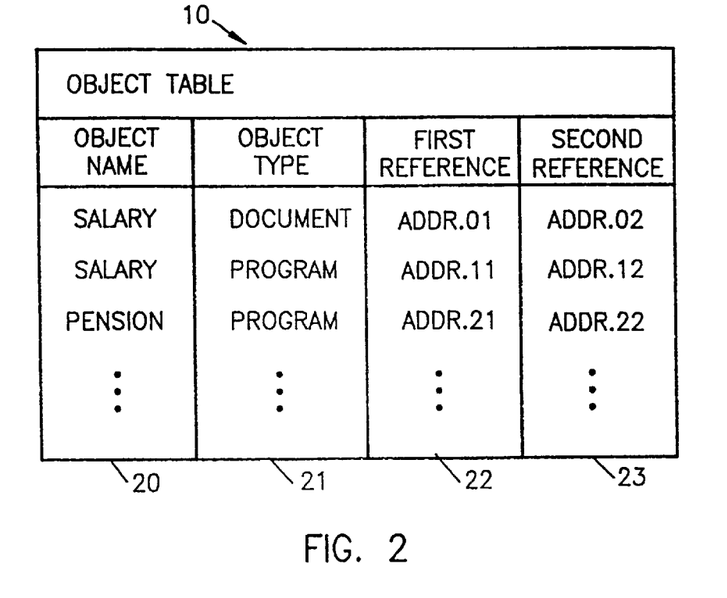
FIG. 2 is an object table belonging to the embodiment of FIG. 1.

As shown in FIG. 2, the object table 10 has a column for an object name 20, a column for an object type 21, a column for a first reference 22, and a column for a second reference 23. Each line of the object table 10 contains the relevant information for a particular object. The object name 20 may be chosen at random, whereas the object type 21 depends on the respective object data. In the column for the first reference 22 an address is specified for each object, which points to a version table 11 associated with the object. In the column for the second reference 23 an address is specified pointing to a component table 12 associated with the object. Thus each object has an associated version table 11 and a component table 12. The number of objects corresponds to the number of version tables 11 or component tables 12. The references from the object table 10 to the associated version tables 11 and the associated component tables 12 are marked by an arrow in FIG. 1. The individual version tables 11 or component tables 12 may have a predetermined length or be variable as a function of stored length data.

Figure 3:
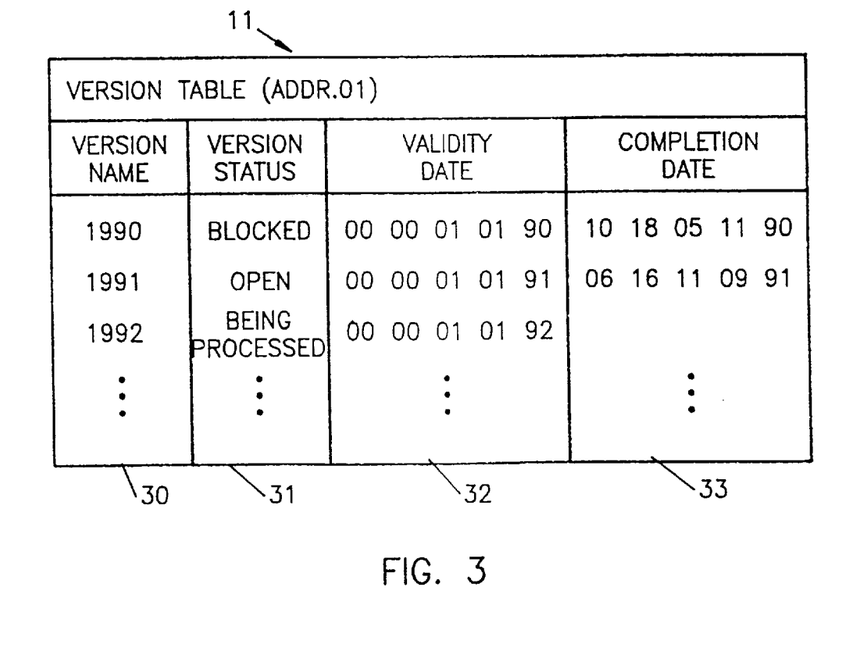
FIG. 3 is a version table belonging to the embodiment of FIG. 1.

According to FIG. 3, a version table 11 contains a column for a version name 30, a column for a version status 31, a column for a validity date 32, as well as a column for a completion date 33. Each line of the version table 11 contains the relevant information for a particular version of the object, as indicated by the first reference 22. The version name 30 may take the form of a year-date. The version status 31 may be "blocked", meaning that the components of the version may only be read but not changed. The version status 31 may also be "open" meaning that the components of the version may be read and changed. Finally, the version status 31 may contain the information "being processed", meaning that the version concerned is the most recent one to be processed and that processing is not yet completed. The validity date 32 of a version denotes that point in time as of which the version is supposed to be valid. The validity date 32 consists of day and hour information and is specified in the following form in the version table 11: minute, hour, day, month, year, for each of which two digits are provided. The point in time denoted by the validity date 32 belongs to the validity period of the version. The completion date 33 of a version defines that point in time at which processing of the version is completed. The completion date 33 is specified in the same way as the validity date 32. The point in time indicated by the completion date 33 is that one at which processing of the respective version is completed or, in other words, at which processing of the next version begins. From the completion dates 33 of two successive versions the period in which the latest of the two versions was processed is derived. For the oldest version of an object this period in the past is open; for the youngest or most recent version of an object being processed this period extends from the completion date 33 of the preceding version up to the present.

Figure 4:
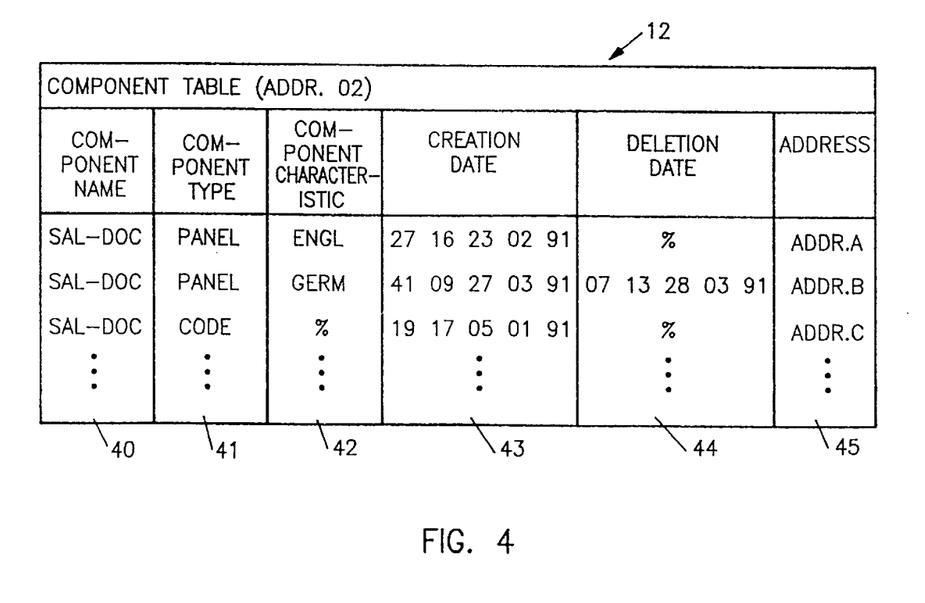
FIG. 4 is a component tables belonging to the embodiment of FIG. 1.

As shown in FIG. 4, the component table 12 has a column for a component name 40, a column for a component type 41, a column for a component characteristic 42, a column for a creation date 43, a column for a deletion date 44, and a column for an address 45. The lines of the component table 12 contain information, if any, for one component each. The components belong to the object marked by the second reference 23. The component names 40 may be chosen at random, whereas the component type depends on the significance of the data contained in the component. The component characteristic 42 may denote, for example, different languages, i.e. whether the output for the associated component on the screen is in English or German. The creation date 43 defines that point in time at which the component was created. The creation date 43 is specified in the same manner as the validity date 32. The point in time indicated by the creation date 43 is the actual point in time at which the respective component was created. The deletion date 44 defines the point in time at which a component was deleted. The deletion date 44 is specified in the same manner as the validity date 32. Similar to the creation date 43, the deletion date 44 marks the point in time at which a component was actually deleted. Address 45 points to that position in the storage means at which the respective component is stored. Address 45 may be, for instance, a physical address that directly refers to the component.

As is also shown in FIG. 1, an instruction processing means 15 is provided which executes on the processor 9 and interacts with the table 10, the version table 11 and the component table 12. Also provided is a relation table 17 which is coupled to the instruction processing means 15. The relation table 17 is stored in the storage means of the computer system and contains dependencies of components within an object. Thus, such dependencies may be stored in the form of structure trees in the relation table 17, so that objects depending on a particular object or other objects or components depending upon particular components may be located.

The instruction processing means 15 may be provided in the operating system of the computer system or as a microprogram. As shown in FIG. 1, the instruction processing means 15 serves in each case to receive instructions and to process them with the aid of the object table 10, the version tables 11, the component tables 12, and the relation table 17. The result of the instruction processing means 15 is the output of the address 45 from the component table 12. The instruction processing means 15 is described in detail below with reference to particular instructions.

Figure 5:
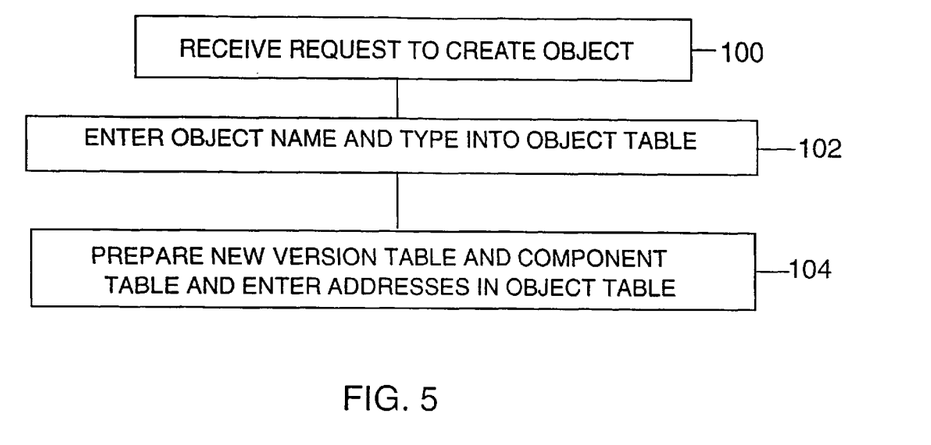
FIG. 5 is a flow chart illustrating generation of the object table of FIG. 2.

If, for example, a new object is to be created by means of the instruction "Create Object: Object Name, Object Type" (step 100 of FIG. 5), then the instruction processing means 15 enters this object name and the object type into the associated columns 20 and 21 of the object table 10 (step 102), provided that an object having the same name and type does not already exist. Subsequently, the instruction processing means 15 prepares a new version table 11 and a new component table 12, associating them with the new object (step 104). For this purpose, the address of the version table 11 is entered as the first reference 22 into the associated column of the object table 10, and the address of the component table 12 provided for the new object is entered in the same way as the second reference 23 into the associated column of the object table 10 (step 104). This completes the processing cycle of the instruction, and versions and components of the object may be entered into the version table 11 and the component table 12.

Figure 6:
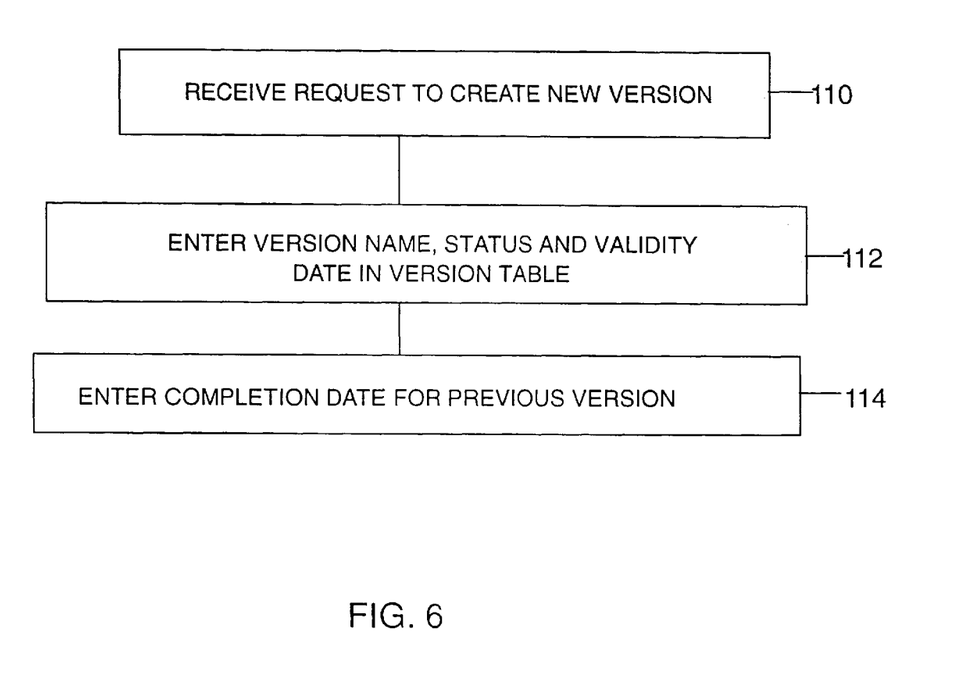
FIG. 6 is a flow chart illustrating update of the version table of FIG. 3.

If, for example, a new version of a particular object is to be created by means of the instruction "Create Version: Object Name, Object Type, Version Name, Version Status, Validity Date" (step 110 of FIG. 6), then the instruction processing means 15 enters the version name 30, the version status 31 and the validity date 32 into the associated columns of the version table 11 specified by the first reference 22 (step 112). In addition, for older versions, the actual current date of this entry or another point in time between the current date and the validity date is recorded as the completion date in the associated column of the preceding version (step 114). Such entries are made only if the proposed version name does not already exist in the version table 11. The version status of a new version is normally "being processed", so that there is no completion date 33 for it in the associated column of the version table 11.

Figure 7:
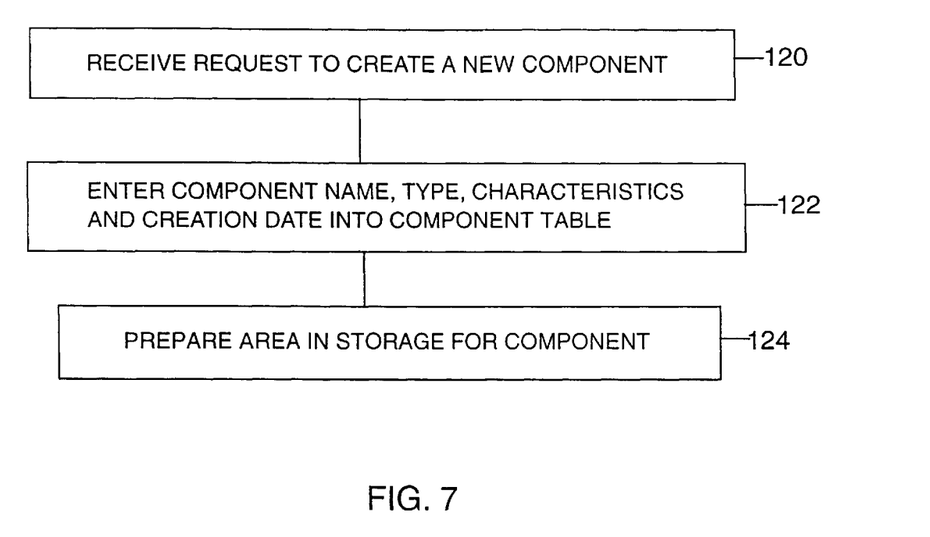
FIG. 7 is a flow chart illustrating update of the component table of FIG. 4 to add an object.

If, for example, a new component is to be created by means of the instruction "Create Component: Object Name, Object Type, Version Name, Component Name, Component Type, Component Characteristic" (step 120 of FIG. 7), then the processing means 15 enters the component name 40, the component type 41 and the component characteristic 42 into the associated columns of the component table 12, as specified by the second reference 23 (step 122). If the version specified in the instruction is the one undergoing processing, the processing means 15 enters the actual current date as the creation date 43 into the associated column of the component table 12 (step 122). If, on the other hand, the specified version is an earlier version, i.e. a version that is not current processed, the instruction processing means 15 enters the completion date 33 of the respective preceding versions 11 as the creation date 43 into the associated column of the component table 12, provided the component name, the component type and the component characteristics do not already exist in the component table 12. Finally, the instruction processing means 15 prepares an area in the storage means, associating said area with the new component (step 124). For this purpose, the start address of the area is entered as address 45 into the associated column of the component table 12 (step 124). The address 45 is then returned by the instruction processing means 15 to the triggering instruction, so that the new component may be entered into said area. The area defined by the address 45 may have a fixed length or be variable as a function of stored length data.

If, for example, a particular existing component is to be changed by means of the instruction "Edit Component: Object Name, Object Type, Version Name, Component Name, Component Type, Component Characteristic", then the instruction processing means 15 uses the second reference 23 to look for the specified component in the component table 12 associated with the object. If the desired component is found, the instruction processing means 15 compares the creation date 43 of the component with the completion date of the version preceding that specified in the instruction. This completion date 33 is supplied to the instruction processing means 15 by the first reference 22 from the version table 11. If the version specified in the instruction is the one that is currently processed and if the creation date 43 of the component to be changed is equal to or more recent than the completion date 32 of the preceding version, the specified component is not copied but its address 45 is directly returned to the triggering instruction, so that the component may then be changed. If, on the other hand, the version specified in the instruction is the one currently processed and the creation date 43 of the specified component to be changed is older than the completion date of the preceding version, the component is copied. The copied component is newly entered into the component table 12 with the actual current date as the creation date 43. In the latter case, the existing component and the new, copied component have the same component name, component type and component characteristics but different creation dates. As a result, the existing component remains unchanged, while the new, copied component may be subsequently changed. For this purpose, the start address of the copied component is entered as address 45 into the component table 12 and returned by the instruction processing means 15 to the triggering instruction. If, as yet another alternative, the version specified in the instruction is not the version currently processed but an older version, the instruction processing means looks for the component to be changed only in the period before the completion date 33 of the version specified by the instruction. Using the completion date 33 as a basis, the instruction processing means 15 thus looks for that component whose creation date 43 in retrospect is the first date found to be older than said completion date. This component is copied and newly entered into the component table 12. In this case, the creation date recorded for the copied component is not the actual current date but the completion date 33 of the version preceding the one specified in the instruction. The existing and the new, copied component thus have the same component name, component type and component characteristic but differ with regard to their creation date. The existing component is retained unchanged but must be deleted in particular cases if, for instance, its creation date is younger than the creation date of the copied component. The new, copied component has a creation date 43 coming within the period of that specified in the instruction, so that the copied component is associated with the version specified therein. The new, copied version may then be changed, for which purpose the instruction processing means 15 enters the start address of the copied component as address 45 into the component table 12 and returns said address 45 to the instruction that has triggered the entire process.

Figure 8:
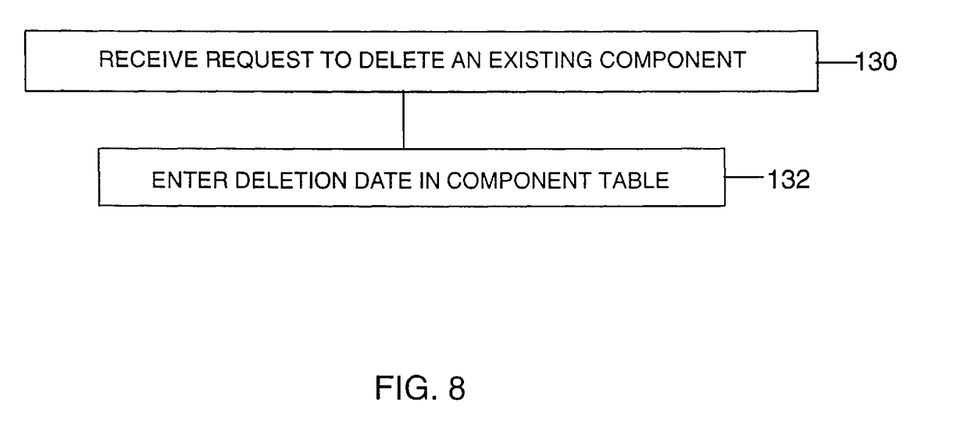
FIG. 8 is a flow chart illustrating update of the component table of FIG. 4 to delete an object.

If, for example, a component is to be deleted by means of the instruction "Delete Component: Object Name, Object Type, Version Name, Component Name, Component Type, Component Characteristic" (step 130 of FIG. 8), then the instruction processing means 15 looks for the respective component in the component table 12 by means of the first reference 22 and the second reference 23. If the version specified in the instruction is the one undergoing processing, the instruction processing means 15 enters the actual current point in time as the deletion date into column 44 of the component table 12 (step 132). If, on the other hand, the version specified in the instruction is not the one currently processed but a preceding version, then the instruction processing means 15 looks for the desired component in the version following the specified one (step 132). If the search is unsuccessful, the instruction processing means 15 enters a new version between the specified and the following version into version table 11. In this case, the version name, the version status and the validity date correspond to those of the version specified by the instruction. In the latter case, the completion date 33 entered by the instruction processing means 15 is the creation date 43 of the component found in the version specified by the instruction. Then, this creation date 43 of the found component is also entered as a deletion date into the associated column of the component table 12.

Figure 9:
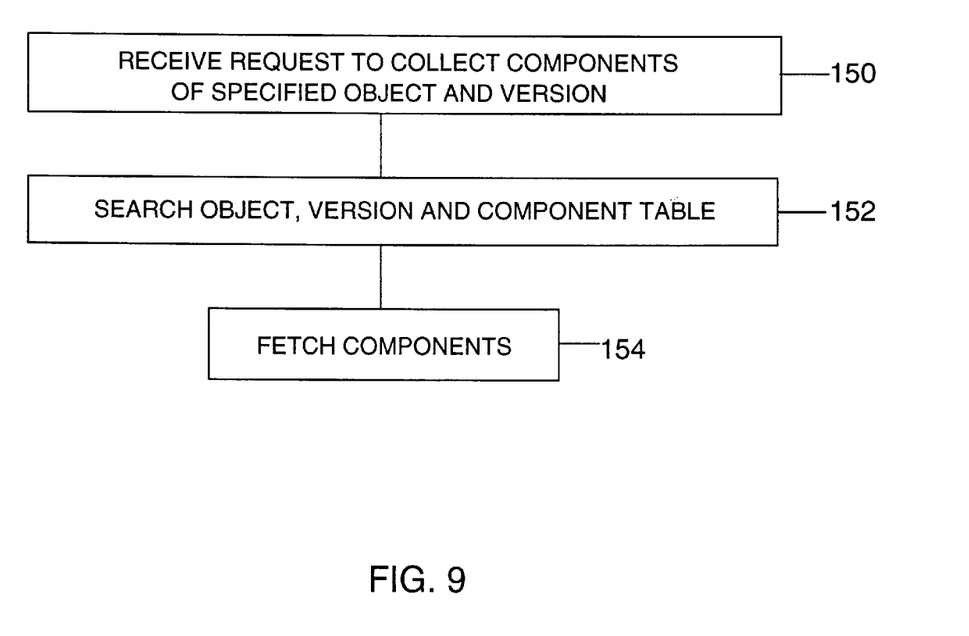
FIG. 9 is a flow chart illustrating use of the tables of FIGS. 2–4 to collect objects identified for a particular object and version.

If, for example, the various components of a particular object of a particular version are to be output by means of an instruction "Collect Object: Object Name, Object Type, Version Name" (step 150 of FIG. 9), then the instruction processing means 15 checks the component table 12 specified by the second reference 23 for all those components having a creation date 43 older than the completion date 33 of the version specified by the instruction, which is indicated by the first reference 22 in the version table 11 (step 152). The component selected is always that one whose creation date 43 in retrospect is the first one found to be older than the specified completion date 33. Components with a deletion date 44 are not considered. The instruction processing means 15 then reads the addresses 45 of all the components thus found from the component table 12, returning said addresses 45, for example, in the form of an address table, to the triggering instruction (step 154). Subsequently, the various object components may be read from the storage means with the aid of the addresses 45.

I claim:

1. A method for creating an object in a computer system, said method comprising the computer implemented steps of:

generating and storing an object table, said object table identifying an object, an associated version table and an associated component table;

generating and storing said version table, said version table comprising first and second identifications and first and second completion dates of first and second versions, respectively of said object, said second completion date being later than said first completion date; and generating and storing said component table, said component table comprising identifications and creation dates of first and second components of said object, the creation date of said first component being before said first completion date such that said first component is part of said first and second versions, and the creation date of said second component being after said first completion date but before said second completion date such that said second component is part of said second version but not part of said first version.

2. A method as set forth in claim 1 further comprising the steps of creating a new object and storing in said object table identifications of said new object, an associated version table and an associated component table.

3. A method as set forth in claim 1 further comprising the step of storing in said version table first and second validity dates for said first and second versions, respectively.

4. A method as set forth in claim 1 wherein said version table includes a validity date of said second version before said second completion date, and further comprising the step of deleting said first component from said second version but not from said first version by entering in said component table for said first component a deletion date before said validity date but after said first completion date.

5. A method as set forth in claim 1 wherein said version table includes a validity date of said second version before said second completion date and after said first completion date, and further comprising the step of adding a third component to said second version but not to said first version by adding to said component table an identification and creation date of said third component, said creation date of said third component being between said validity and second completion dates.

6. A method as set forth in claim 1 further comprising the step of entering in said component table respective storage addresses of said first and second components.

7. A method as set forth in claim 1 wherein said identification and creation date of said second component were stored in said component table at a later date than said identification and creation date of said first component without updating said object or version tables.

8. A method as set forth in claim 1 wherein said version table is identified by an address of said version table and said component table is identified by an address of said component table.

9. A method as set forth in claim 1 wherein said version table includes a validity date but no completion date for a third version of said object and an indication that said third version is currently being processed, said validity date being after said second completion date.

10. A method as set forth in claim 3 further comprising the step of adding a third component to said second version by adding to said component table an identification and creation date of said third component, said creation date of said third component being same as or after the validity date of said second version.

11. A method for creating and listing an object in a computer system, said method comprising the computer implemented steps of:

generating and storing an object table, said object table identifying an object, an associated version table and an associated component table;

generating and storing said version table, said version table comprising first and second identifications and first and second completion dates of first and second versions, respectively of said object, said second completion date being later than said first completion date;

generating and storing said component table, said component table comprising identifications and creation dates of first and second components of said object, the creation date of said first component being before said first completion date such that said first component is part of said first and second versions, and the creation date of said second component being after said first completion date but before said second completion date such that said second component is part of said second version but not part of said first version;

receiving a request to list components of said first version of said object; and in response, locating the identifications of said object, associated version table and associated component table in said object table, determining from said version table the completion date of said first version and determining from said component table and listing identifications of components which were created and not deleted before said completion date of said first version.

12. A computer system for creating an object, said system comprising:

means for generating and storing an object table, said object table identifying an object, an associated version table and an associated component table;

means for generating and storing said version table, said version table comprising first and second identifications and first and second completion dates of first and second versions, respectively of said object, said second completion date being later than said first completion date; and means for generating and storing said component table, said component table comprising identifications and creation dates of first and second components of said object, the creation date of said first component being before said first completion date such that said first component is part of said first and second versions, and the creation date of said second component being after said first completion date but before said second completion date such that said second component is part of said second version but not part of said first version.

13. A system as set forth in claim 12 wherein said version table includes a validity date of said second version before said second completion date but after said first completion date, and further comprising means for deleting said first component from said second version but not from said first version by entering in said component table for said first component a deletion date before said validity date but after said first completion date.

14. A system as set forth in claim 12 wherein said version table includes a validity date of said second version before said second completion date and after said first completion date, and further comprising means for adding a third component to said second version but not to said first version by adding to said component table an identification and creation date of said third component, said creation date of said third component being between said validity and second completion dates.

15. A system as set forth in claim 12 further comprising means for entering in said component table respective storage addresses of said first and second components.

16. A system as set forth in claim 12 wherein the identification and creation date of said second component were stored in said component table at a later date than the identification and creation date of said first component without updating said object or version tables.

17. A computer system for creating and listing an object, said system comprising:

means for generating and storing an object table, said object table identifying an object, an associated version table and an associated component table;

means for generating and storing said version table, said version table comprising first and second identifications and first and second completion dates of first and second versions, respectively of said object, said second completion date being later than said first completion date;

means for generating and storing said component table, said component table comprising identifications and creation dates of first and second components of said object, the creation date of said first component being before said first completion date such that said first component is part of said first and second versions, and the creation date of said second component being after said first completion date but before said second completion date such that said second component is part of said second version but not part of said first version; and means for receiving a request to list components of said first version of said object, and in response, locating the identifications of said object, associated version table and associated component table in said object table, determining from the version table the completion date of said first version and determining from the component table and listing identifications of components which were created and not deleted before said completion date of said first version.

* * * * *